United States Patent [19]

Haase et al.

[11] 4,424,284
[45] Jan. 3, 1984

[54] CATIONIC ADSORPTION AGENT

[75] Inventors: Jaroslav Haase, Riehen; Roger Palmberg, Allschwil, both of Switzerland

[73] Assignee: Ciga-Geigy Corporation, Ardsley, N.Y.

[21] Appl. No.: 313,061

[22] Filed: Oct. 19, 1981

[30] Foreign Application Priority Data

Oct. 28, 1980 [CH] Switzerland ................ 8016/80

[51] Int. Cl.³ ............................................. C08G 12/22
[52] U.S. Cl. .................................. 521/36; 521/30; 521/35; 521/37; 521/39; 523/310; 528/254; 528/256; 528/259; 528/265
[58] Field of Search ............... 521/30, 35, 36, 37, 521/39; 523/310; 528/254, 256, 259, 265

[56] References Cited

U.S. PATENT DOCUMENTS

| | | | |
|---|---|---|---|
| 2,203,492 | 6/1940 | Evans et al. | 8/74 |
| 2,203,493 | 6/1940 | Evans et al. | 8/120 |
| 2,367,455 | 1/1945 | Bock et al. | 260/72 |
| 3,189,646 | 6/1965 | Rainer et al. | 260/561 |
| 4,178,438 | 12/1979 | Haase et al. | 536/30 |
| 4,316,005 | 2/1982 | Wurster et al. | 528/256 |

FOREIGN PATENT DOCUMENTS

| | | |
|---|---|---|
| 497042 | 6/1938 | United Kingdom . |
| 497043 | 6/1938 | United Kingdom . |
| 497485 | 6/1938 | United Kingdom . |
| 497368 | 6/1938 | United Kingdom . |

*Primary Examiner*—Lucille M. Phynes
*Attorney, Agent, or Firm*—Edward McC. Roberts

[57] ABSTRACT

A cationic adsorption agent which is obtained by reaction of (a) an amino compound which contains at least one amino group and at least one free or methylolated carbamide or thiocarbamide group, or a salt thereof, with (b) an aminoplast precondensate which does not contain amino groups.

The novel absorption agent is suitable in particular for removing anionic substances, such as acid dyes or reactive dyes, from aqueous solutions, especially from wastewaters.

19 Claims, No Drawings

CATIONIC ADSORPTION AGENT

The present invention relates to a cationic adsorption agent which is suitable for removing anionic substances from aqueous solutions, especially from wastewaters, e.g. filtrates, residual liquors of bleaching or dyeing processes, rinsing and wash waters.

The adsorption agent of this invention is obtained by reaction of (a) an amino compound which contains at least one amino group and at least one free or methylolated carbamide or thiocarbamide group, or a salt thereof, with (b) an aminoplast precondensate which does not contain amino groups.

The methylolated carbamide or thiocarbamide groups of component (a) can be etherified or preferably free.

Component (b) is a compound which contains amide groups but does not contain basic amino groups. Components (a) and (b) together advantageously contain at least two free or etherified N-methylol groups.

It is particularly advantageous to obtain the adsorption agent with amino compounds (a) of the formula

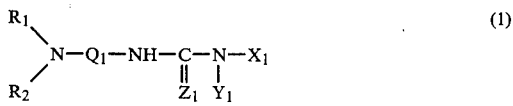

wherein each of $R_1$ and $R_2$ independently is lower alkyl which is unsubstituted or substituted by halogen, hydroxyl, lower alkoxy or cyano, or is cycloalkyl, benzyl or the group of the formula

or $R_1$ and $R_2$, together with the nitrogen atom to which they are attached, are a 5- oder 6-membered heterocyclic radical preferably a pyrrolidino, piperidino, morpholino or N-methylpiperazino group; each of $Q_1$ and $Q_2$ independently is alkylene of 2 to 6 carbon atoms and $Q_2$ is also methylene; each of $X_1$ and $X_2$ independently is hydrogen or —$CH_2OT_1$; each of $Y_1$ and $Y_2$ independently is hydrogen, lower alkyl or —$CH_2OT_2$; each of $Z_1$ and $Z_2$ independently is oxygen or sulfur; and each of $T_1$ and $T_2$ independently is hydrogen or lower alkyl; or salts thereof.

The N-methylolcarbamides can be in the form of free bases, acid salts or, preferably, of quaternary ammonium salts. Suitable salt forming acids are organic or, preferably, inorganic acids, e.g. formic acid, acetic acid, sulfuric acid or, in particular, hydrochloric acid.

The salts preferably have the formula

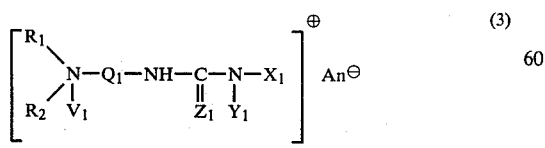

wherein $V_1$ is hydrogen, lower alkyl which is unsubstituted or substituted by hydroxyl, halogen, cyano, carbamoyl or lower alkoxy, or is benzyl; or $R_1$, $R_2$ and $V_1$, together with the nitrogen atom to which they are attached, form a pyridine ring which is unsubstituted or substituted by lower alkyl; and $An^\ominus$ is the anion of an organic or inorganic acid and $R_1$, $R_2$, $Q_1$, $Z_1$, $Y_1$ and $X_1$ have the given meanings.

Compounds of the formulae (1) and (3), wherein the pairs of substituents ($R_1$ and $R_2$), ($T_1$ and $T_2$), ($Z_1$ and $Z_2$), ($Y_1$ and $Y_2$) and ($X_1$ and $X_2$), each independently of the other, are identical, are preferred. $Z_1$ and $Z_2$ are preferably oxygen and $X_1$ and $X_2$ are preferably —$CH_2OH$. In the compounds of formula (1), both substituents $R_1$ and $R_2$ are preferably lower alkyl or, together with the nitrogen atom to which they are attached, are a 5- or 6-membered saturated heterocyclic radical. In the compounds of formula (3), the substituents $R_1$, $R_2$ and $V_1$ are all preferably lower alkyl.

The unmethylolated basic carbamides or thiocarbamides of component (a) can be obtained by reacting a corresponding N-substituted diamino compound, e.g. 3-dimethylaminopropylamine, with a urea or thiourea, with elimination of ammonia. The addition salts can be obtained by addition of an inorganic acid or organic acid to the free amines.

The quaternary salts are obtained in conventional manner by reacting the basic carbamides or thiocarbamides with suitable quaternising agents. Examples of suitable quaternising agents are $C_1$—$C_4$alkyl halides such as methyl iodide, methyl chloride, ethyl bromide or ethyl chloride; di($C_1$—$C_4$)alkyl sulfates such as dimethyl sulfate or diethyl sulfate; halocarboxamides such as chloroacetamide; haloalkyl nitriles such as chloroacetonitrile; benzyl halides such as benzyl chloride; and esters of sulfonic acids of the benzene series, e.g. $C_1$—$C_4$alkyl esters such as the methyl, ethyl and propyl esters of benzenesulfonic acid, p-methylbenzenesulfonic acid or p-chlorobenzenesulfonic acid.

The basic carbamides or thiocarbamides obtained are preferably metholylated by reaction with formaldehyde or a formaldehyde donor, advantageously in the temperature range from 0° to 100° C., preferably from 20° to 90° C., and, if desired, the resultant methylol compounds are etherified with a $C_1$—$C_4$alcohol, e.g. methanol or ethanol, preferably in the presence of an acid, e.g. hydrochloric acid or phosphoric acid. Preferred formaldehyde donors are trioxane, paraformaldehyde or hexamethylenetetramine. The methylolation is carried out in the presence or absence of a basic catalyst such as sodium hydroxide, sodium methylate or MgO.

Particularly preferred amino compounds as component (a) are those of the formula

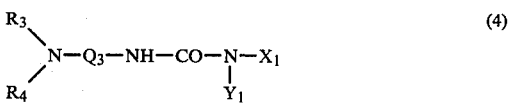

wherein each of $R_3$ and $R_4$ independently is lower alkyl, benzyl or the group of the formula

or $R_3$ and $R_4$, together with the nitrogen atom to which they are attached, are a 5- or 6-membered heterocyclic radical; $Q_3$ is $C_2$—$C_3$alkylene; and $X_1$ and $Y_1$ have the given meanings.

More preferred are amino compounds of the formula (4) which contain only one single grouping of the formula (5). In such compounds, $R_3$ and $R_4$ are preferably lower alkyl, $Y_1$ is preferably hydrogen or —$CH_2OH$, and $X_1$ is preferably —$CH_2OH$.

Particularly preferred quaternary ammonium salts of the formula (3) are those of the formula

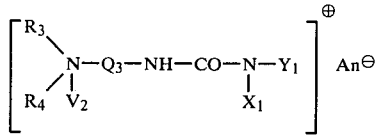

wherein each of $R_3$, $R_4$ and $V_2$ is lower alkyl, and $Q_3$, $X_1$, $Y_1$ and $An^\ominus$ have the given meanings.

In the definition of the radicals of the novel compounds, lower alkyl and lower alkoxy usually denote those groups or group components which contain 1 to 5, in particular 1 to 3, carbon atoms, e.g. methyl, ethyl, n-propyl, isopropyl, n-butyl, sec-butyl or amyl, and methoxy, ethoxy or isopropoxy.

Halogen in connection with all substituents is, for example, fluorine, bromine or, preferably, chlorine.

Particularly interesting compounds as component (a) are basic N-methylolcarbamides of the formulae $(CH_3)_2N$—$CH_2CH_2CH_2$—NH—CO—NH—$CH_2OH$, (7)

$(CH_3)_2N$—$CH_2CH_2CH_2$—NH—CO—$N(CH_2OH)_2$, (8)

$(C_2H_5)_2N$—$CH_2CH_2$—NH—CO—NH—$CH_2OH$, (9)

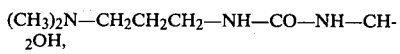
(10)

and, in particular, the quaternary ammonium salts of the formulae $[(CH_3)_3N$—$(CH_2)_3$—NH—CO—$N(CH_2OH)_2]$
$\oplus Cl^\ominus$ (11)

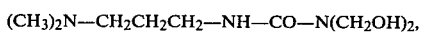
(12)

$[(CH_3)_3N$—$(CH_2)_3$—NH—CO—$NHCH_2OH]\oplus Cl^\ominus$ (13)

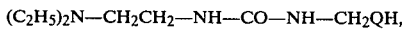
(14)

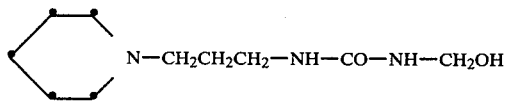
(15)

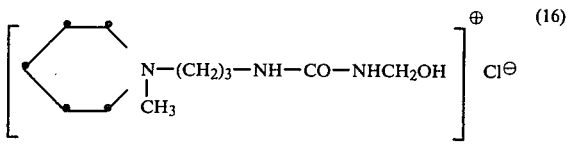
(16)

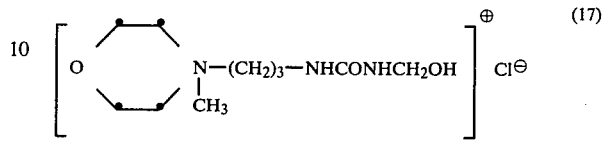
(17)

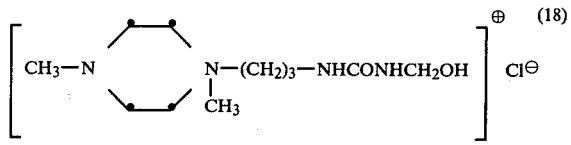
(18)

Suitable for use as component (b) are adducts of formaldehyde with methylolatable amide compounds which do not contain basic amino groups, e.g. ureas, thioureas and amino-1,3,5-triazines.

Examples of suitable ureas and thioureas are urea, thiourea, substituted ureas such as alkyl or aryl ureas, alkylene ureas and alkylene diureas such as ethylene urea, propylene urea, dihydroxyethylene urea, hydroxypropylene urea and acetylene diurea, and also dicyandiamide, dicyandiamidine, urones and hexahydropyrimidones.

Examples of suitable 1,3,5-aminotriazines are: melamine and N-substituted melamines, such as N-methylmelamine, N-ethylmelamine, N-propylmelamine and N-butylmelamine, triazones, ammeline, guanamines, e.g. benzoguanamine, acetoguanamine, diguanamines, and guanidines.

Suitable aminoplast precondensates are both primarily monomolecular compounds and higher precondensed products.

Both completely methylolated and only partially methylolated compounds, which can also be etherified, also yield useful products.

Preferred aminoplast precondensates are the methylolated ureas and amino-1,3,5-triazines specified above. Of these compounds, N-methylol ureas and N-methylol melamines are especially preferred. It is also possible to use partial ethers of such methylol compounds, e.g. with alkanols containing 1 to 4 carbon atoms, such as methanol, ethanol, n-propanol or n-butanol. Examples of specific aminoplast precondensates (b) are: N-methylol urea, N,N'-dimethylol urea, N,N'-dimethylol urea dimethyl ether, N,N'-tetramethylol acetylene diurea, N,N'-dimethylol ethylene urea, N,N'-dimethylol propylene urea, 4,5-dihydroxy-N,N'-dimethylol ethylene urea, N,N'-dimethylol-5-hydroxypropylene urea, 4-methoxy-5,5-dimethyl-N,N'-dimethylolpropylene urea, N,N'-dimethylol-5-oxapropylene urea, N,N'-dimethylol thiourea, 4,5-dihydroxy-N,N'-dimethylolethylene urea dimethyl ether, N,N'-dimethylol-5-oxapropylene urea dimethyl ether, dimethylol, melamine, trimethylol melamine, tetramethylol melamine, hexamethylol melamine, hexamethylol melamine pentamethyl ether, pentamethylol melamine dimethyl or trimethyl ether, hexamethylol melamine hexamethyl or hexaethyl ether.

Of these compounds, N-methylol urea, N,N'-dimethylol urea and tri- to hexamethylol melamines are especially preferred.

It is also possible to use mixtures of these methylolated urea and melamine compounds.

The cationic adsorption agent of the present invention is obtained by reacting
(a) an amino compound which contains at least one amino group and at least one free or methylolated carbamide or thiocarbamide group,
with
(b) an aminoplast precondensate which does not contain amino groups or with its process mixture.

The reaction is preferably conducted in an aqueous acid medium, e.g. at a pH value from 2 to 6 and advantageously in the temperature range from 20° to 200° C., preferably from 50° to 180° C. and, most preferably, from 60° to 120° C. It is preferred to use a catalyst.

Preferred catalysts are inorganic and/or organic acids or anhydrides or salts thereof, e.g. sulfurous acid, sulfuric acid, sulfamic acid, phosphoric acid, hydrochloric acid, chloroacetic acid, maleic acid or the anhydride thereof, and also ammonium chloride, ammonium nitrate, ammonium phosphate, ammonium acetate or aluminium sulfate. The most preferred catalyst is sulfamic acid.

The adsorption agent of the present invention is advantageously synthesized from 1 mole of component (a) and 0.5 to 10 moles, preferably 1.5 to 3.5 moles, of component (b).

The total nitrogen content, which also comprises the amide nitrogen, is usually at least 10% by weight, preferably 15% to 40% by weight.

The adsorption agent of the present invention is suitable in particular for removing anionic substances from aqueous solutions, especially from wastewaters, and its efficiency is substantially greater than that of conventional adsorbents. Compared with known agents, e.g. activated carbon, the novel adsorption agent is distinguished in particular by a pronounced adsorptive capacity for substances, specially anionic substances, which are dissolved or dispersed in water.

Accordingly, the present invention also provides a process for removing anionic substances from aqueous solutions, which process comprises contacting said aqueous solutions with the novel cationic adsorption agent.

This process is suitable in particular for purifying aqueous liquors which contain organic anionic substances and mixtures thereof. It is possible in particular to remove anionic dyes, fluorescent whitening agents, dyeing or textile assistants, surfactants, tannins and mixtures thereof, as well as humic acids, from the wastewaters to a satisfactory degree. In the practice of this invention, wastewaters which contain mixtures of anionic dyes and anionic assistants can be successfully purified.

On account of the broad applicability of the adsorption agent used in this invention, it is possible to meet the present ever more urgent demand for saving fresh water by a partial to complete recirculation of residual or waste liquors. Independently of the apparatus used, these are principally the wastewaters of the dyestuff, fibre manufacturing, textile, paper, and leather industry, which occur in connection with dyeing, bleaching, washing and tanning processes. In the case of a dyeworks, these wastewaters can originate from the conventional dyeing machines used for the dyeing of loose fibrous material, tops, yarn, and woven and knitted fabrics, and also from cleaning machines, e.g. an open-width washer.

The purification of the wastewaters is advantageously carried out in the temperature range from 2° to 150° C. with the preferred range, however, being from 10° to 100° C., especially 20° to 70° C. If desired, it is also possible to purify the wastewaters under pressure or in vacuo. The pH of the liquor can vary within wide limits, for example from 2 to 12, but the quaternary ammonium compounds, especially those of the formula (6), can be used even up to a pH value of 14 without any substantial loss of capacity. Depending on the nature of the adsorption agent employed, pH adjustments, for example to a value of 2 to 9, in particular of 3 to 8, can simplify and speed up the purification process.

The treatment of the wastewaters can be carried out discontinuously, semi-continuously or continuously. In principle, the following three processes are suitable within the scope of the invention:
a. the stirring process, in which the water to be purified is stirred in a vessel, or a number of vessels, with the adsorption agent and then the two are separated;
b. the fluidised bed process, in which the adsorption agent is kept in suspension through the stream of the liquor to be purified;
c. the fixed bed process, in which the liquor to be purified is conducted through a filter-like adsorption agent.

Preferably, the treatment of the wastewaters is carried out according to process a.

If desired, the cationic adsorption agent to be employed in the practice of this invention can be mixed with other ion exchangers or adsorbents, e.g. activated carbon and/or other known filtration aids, e.g. peat, kieselguhr or diatomaceous earth. For example, the activated carbon may be added to the novel adsorption agent in an amount of 2 to 95% by weight, preferably 10 to 70% by weight, based on the weight of the cationic adsorption agent.

The dyes which are removed from wastewaters by the process of this invention are anionic dyes and fluorescent whitening agents which are both water-soluble and dispersed in water.

In particular, the process of the invention is suitable for removing water-soluble anionic dyes or fluorescent whitening agents.

The anionic dyes are dyes whose anionic character is dependent on metal complex formation alone and/or on the acid substituents which impart water-solubility.

Suitable acid substituents which impart water-solubility are carboxylic acid groups, phosphoric acid groups, acylated sulfonic acid imide groups, such as alkyl- or aryldisulfimide groups or alkyl- or arylcarbonylsulfimide groups, alkyl- or arylimide groups, sulfuric acid ester groups and especially sulfonic acid groups.

The anionic dyes can belong to a wide variety of different classes of dye. Representative examples are oxazine, triphenylmethane, xanthene, nitro, acridone, stilbene, perinone, naphthoquinone-imine, phthalocyanine, anthraquinone and azo dyes. These last mentioned dyes can be metal-free, metallisable or metal-containing monoazo, disazo and polyazo dyes, including formazane dyes, in which the metal atom forms a 1:1 or 1:2 complex, especially 1:2 chromium or 1:2 cobalt complexes which contain two similar or two different molecules of azo dye complexed to a chromium or a cobalt atom. These dyes can also contain reactive groups in the molecule, i.e. groups which form a covalent bond with the fibrous material to be dyed.

The novel adsorption agent is suitable not only for decolouring residual liquors of the dyestuffs undustry and those emanating from the dyeing of textiles, paper and leather, but is also most useful when it is a matter of eliminating residues of anionic fluorescent whitening agents from wash and bleach liquors.

The fluorescent whitening agents can belong to any class of whitener compounds. The anionic fluorescent whitening agents are in particular stilbene compounds, pyrazolines, dibenzoxazolyl or dibenzimidazolyl compounds or naphthalimides which contain at least one acid group in the molecule, for example a carboxylic acid group or preferably a sulfonic acid group, and which can be fibre reactive.

A further advantage of the adsorption agent of this invention is that, besides removing the dyes, it permits also at least a partial elimination of anionic surfactants and textile and dyeing assistants, as well as phosphates, from aqueous waste liquors. Such assistants are described in more detail in "Tenside-Textilhilfsmittel-Waschrohstoffe" by Dr. Kurt Lindner (published by Wissenschaftliche Verlagsgesellschaft Stuttgart, 1964).

The cationic adsorption agent can also be effective in the elimination of anionic synthetic tannins, especially tannins that carry one or more sulfo groups in the molecule. A more detailed description of these compounds can be found e.g. in "Ullmans Encyclopädie der technischen Chemie", Vol. 11, pp. 595–598. The cationic adsorption agent can also be used as general anion exchanger.

Appropriate choice of the adsorption agent makes it possible to extract up to 100% of the dissolved impurities from the wastewaters. It is possible to achieve retardant effects of up to 50 g of waste matter, i.e. dye, fluorescent whitening agent, assistant, detergent or tannin, per 100 g of adsorption agent.

It is preferred to decolour wastewaters having a dye concentration of 0.01 to 5 g/l, in particular 0.01 to 1 g/l, whenever a complete decoloration or removal of the waste substance cannot be accomplished by a single treatment of the waste liquor with the adsorption agent, it is advisable to repeat the purification procedure.

After adsorption of the impurities, the adsorption agent can be easily separated from the purified wastewater. It has a high solids content and can therefore be incinerated direct without drying. If desired, acid salts can also be regenerated with the aid e.g. of a dilute aqueous sodium hydroxide solution or sodium carbonate solution.

The invention is illustrated by the following Examples, in which percentages are by weight.

EXAMPLE 1 26.4 g of N,N'-dimethylol urea are added to 51.7 g of a 40% solution, adjusted to pH 4.6 with conc. hydrochloric acid, of the compound of the formula

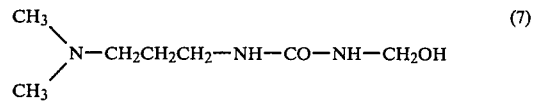

and the mixture is heated to 60° C. To this mixture are then added 10 ml of 15% sulfamic acid, whereupon the reaction mixture solidifies. The reaction mixture is then refluxed for 1½ hours, poured on to a drying plate, and further condensed in a vacuum drying cabinet at 85°–90° C. After 15 hours there are obtained 41.5 g of a pale yellow product which is comminuted and taken up in 2 liters of water. After stirring for 30 minutes, the suspension is filtered through a cloth and the product is dried for 16 hours in a vacuum drying cabinet, affording 24 g of a pale yellow powder with a nitrogen content of 25.34%.

EXAMPLES 2 TO 6

The procedure described in Example 1 is repeated using the starting materials listed in columns 2 and 3 of Table 1 in the specified amounts at pH 7. Reaction product having the respective total nitrogen content indicated in column 4 are obtained.

TABLE 1

| Example | Aminoplast precondensate | | Amino compound (40%) | | N-content in % |
|---|---|---|---|---|---|
| | g | | g | | |
| 2 | 19.8 | monomethylol urea | 51.7 | (CH₃)₂N—(CH₂)₃—NH—CO—NH—CH₂OH | 28.9 |
| 3 | 67.4 | hexamethylolmelamine | 51.7 | " | 30.5 |
| 4 | 26.4 | N,N'—dimethylol urea | 75.0 | (CH₃)₂N—(CH₂)₃—NH—CO—N(CH₂OH)₂ | 24.6 |
| 5 | 19.8 | monomethylol urea | 75.0 | " | 24.7 |
| 6 | 67.4 | hexamethylolmelamine | 75.0 | " | 30.5 |

EXAMPLE 7

25.5 g of a compound of the formula $$[(CH_3)_3N-(CH_2)_3-NH-CO-N(CH_2OH)_2]^{\oplus}Cl^{\ominus} \quad (11)$$

are dissolved in 30 ml of water and the solution is adjusted with conc. hydrochloric acid to pH 4.5. Then 26.4 g of N,N'-dimethylol urea are added and the mixture is heated to 60° C. To this mixture are then added 10 ml of 15% sulfamic acid, to give a glass-clear, thin suspension. The reaction mixture is then heated for 1½ hours to 80°–85° C., poured on to a drying plate, and further condensed in a vacuum drying cabinet at 85°–90° C. After 15 hours there are obtained 42.8 g of a colourless glassy product which is comminuted and taken up in 1.5 liters of water. After stirring for 30 minutes, the suspension is filtered through a cloth and the product is dried for 15 hours in a vacuum drying cabinet, affording 23 g of a white powder with a nitrogen content of 22.9%.

EXAMPLE 8

The procedure described in Example 7 is repeated using the starting materials listed in columns 2 and 3 of Table 2 in the specified amounts at pH 7. Reaction products having the respective total nitrogen content indicated in column 4 are obtained.

TABLE 2

| Example | Aminoplast precondensate (g) | | Quaternary ammonium salt (g) | | N-content in % |
|---|---|---|---|---|---|
| 8 | 53 | N,N'—dimethylol urea | 48 | $[(C_2H_5)_2\overset{\underset{\mid}{CH_3}}{N}-(CH_2)_2-NHCONHCH_2OH]^{\oplus} Cl^{\ominus}$ | 24.5 |
| 9 | 86.5 | " | 80 | $[(C_2H_5)_2\overset{\underset{\mid}{CH_3}}{N}-(CH_2)_3-NHCONHCH_2OH]^{\oplus} Cl^{\ominus}$ | 23.6 |
| 10 | 26.4 | " | 22.3 | $[(CH_3)_3N-(CH_2)_3-NHCONHCH_2OH]^{\oplus}Cl^{\ominus}$ | 22.9 |
| 11 | 47.4 | N,N'—dimethylol urea dimethyl ether | 18.2 | " | 25.7 |
| 12 | 43.6 | N,N'—dimethylol thiourea | 18.2 | " | 30.6 |
| 13 | 41.8 | N,N'—dimethylol-5-oxapropylene urea dimethyl ether | 18.2 | " | 21.2 |
| 14 | 26.4 | N,N'—dimethylol urea | 29.9 | $[HOCH_2NH-COCH_2-\overset{\underset{\mid}{CH_3}}{\overset{\mid}{N}}(CH_3)-(CH_2)_3\overset{\underset{\mid}{CONHCH_2OH}}{NH}]^{\oplus} Cl^{\ominus}$ | 23.8 |
| 15 | 26.4 | " | 25.2 | $[\text{pyrrolidinyl}(CH_3)-(CH_2)_3-NH-CO-NHCH_2OH]^{\oplus} Cl^{\ominus}$ | 24.7 |
| 16 | 26.4 | " | 26.8 | $[\text{piperidinyl}(CH_3)-(CH_2)_3-NH-CO-NHCH_2OH]^{\oplus} Cl^{\ominus}$ | 24.3 |
| 17 | 26.4 | " | 26.8 | $[\text{morpholinyl}(CH_3)-(CH_2)_3-NHCONHCH_2OH]^{\oplus} Cl^{\ominus}$ | 23.1 |
| 18 | 26.4 | " | 28.2 | $[CH_3-N\text{-piperazinyl-}(CH_3)-(CH_2)_3-NHCONHCH_2OH]^{\oplus} Cl^{\ominus}$ | 24.0 |

EXAMPLES 19 TO 36

A three-necked flask equipped with magnetic stirrer, cooler and thermometer is charged with 500 ml of a solution adjusted to pH 7 and containing 0.1% of a dye of the formula

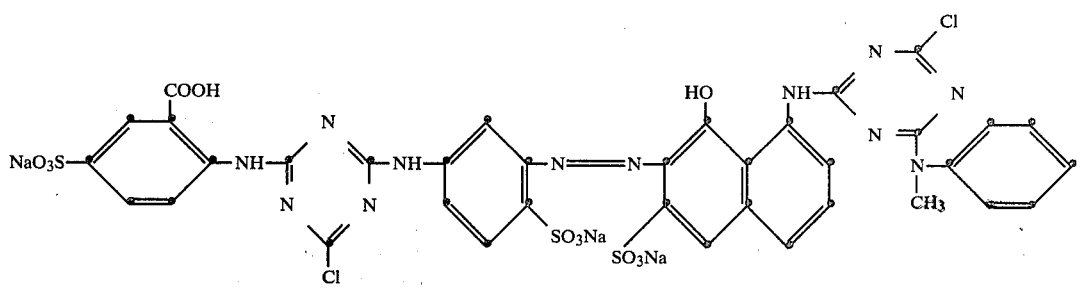

The dye liquor is heated to 50° C. and, in each experiment, 0.5 kg of one of the anion exchangers prepared according to Examples 1 to 18 is added in powder form. A sample is taken in each experiment after an adsorption time of x minutes and filtered through a folded filter. The percentage decoloration of the filtrate is determined and is reported in the last column of Table 3.

TABLE 3

| Example | Adsorbents prepared according to Example | Adsorption time in minutes | Decoloration in % |
|---|---|---|---|
| 19 | 1 | 45 | 50 |
| 20 | 2 | 10 | 24 |
| 21 | 3 | 120 | 35 |
| 22 | 4 | 5 | 50 |
| 23 | 5 | 60 | 60 |
| 24 | 6 | 60 | 20 |
| 25 | 7 | 10 | 90 |
| 26 | 8 | 120 | 62 |
| 27 | 9 | 120 | 70 |
| 28 | 10 | 120 | 87 |
| 29 | 11 | 120 | 72 |
| 30 | 12 | 120 | 20 |
| 31 | 13 | 120 | 23 |
| 32 | 14 | 120 | 28 |
| 33 | 15 | 120 | 79 |
| 34 | 16 | 120 | 70 |
| 35 | 17 | 120 | 85 |
| 36 | 18 | 120 | 67 |

What is claimed is:

1. A cationic adsorption agent which is obtained by reaction of
   (a) an amino compound, or salt thereof, which contains at least one amino group and at least one free or methylolated carbamide or thiocarbamide group, or ether thereof, with
   (b) an aminoplast precondensate which contains no amino groups, being a formaldehyde adduct or an etherified formaldehyde adduct of a urea, thiourea or amino-1,3,5-triazine compound.

2. An adsorption agent according to claim 1 wherein components (a) and (b) together contain at least two free or etherified N-methylol groups.

3. An adsorption agent according to claim 1, wherein component (a) is a corresponding quaternary ammonium salt.

4. An adsorption agent according to claim 1, wherein component (a) is an amino compound of the formula

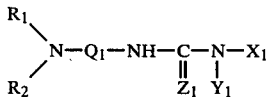

or a salt thereof, wherein each of $R_1$ and $R_2$ independently is lower alkyl which is unsubstituted or substituted by halogen, hydroxyl, lower alkoxy or cyano, or is cycloalkyl, benzyl or the group of the formula

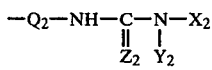

or $R_1$ and $R_2$, together with the nitrogen atom to which they are attached, are a 5- or 6-membered heterocyclic radical;
each of $Q_1$ and $Q_2$ independently is alkylene of 2 to 6 carbon atoms and $Q_2$ is also methylene;
each of $X_1$ and $X_2$ independently is hydrogen or —CH$_2$OT$_1$;
each of $Y_1$ and $Y_2$ independently is hydrogen, lower alkyl or —CH$_2$OT$_2$;
each of $Z_1$ and $Z_2$ independently is oxygen or sulfur; and
each of $T_1$ and $T_2$ independently is hydrogen or lower alkyl.

5. An adsorption agent according to claim 4, wherein component (a) is a quaternary ammonium salt of the formula

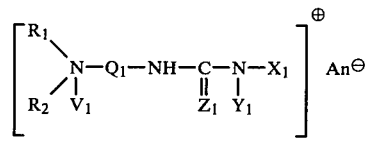

wherein $V_1$ is hydrogen, lower alkyl which is unsubstituted or substituted by hydroxyl, halogen, cyano, carbamoyl or lower alkoxy, or is benzyl, or $R_1$, $R_2$ and $V_1$, together with the nitrogen atom to which they are attached, form a pyridine ring which is unsubstituted or substituted by lower alkyl; and An$^\ominus$ is the anion of an organic or inorganic acid, and $R_1$, $R_2$, $Q_1$, $Z_1$, $Y_1$ and $X_1$ are as defined in claim 4.

6. An adsorption agent according to claim 5, wherein component (a) is a quaternary ammonium salt of formula (3), wherein $R_1$ and $R_2$, together with the nitrogen atom to which they are attached, represent a pyrrolidino, piperidino, morpholino or N-methylpiperazino group.

7. An adsorption agent according to claim 4, wherein component (a) is an amino compound of the formula

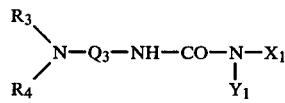

or a salt thereof, wherein each of $R_3$ and $R_4$ independently is lower alkyl, benzyl or the group of the formula

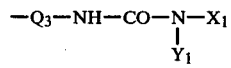

or $R_3$ and $R_4$, together with the nitrogen atom to which they are attached, are a 5- or 6-membered heterocyclic radical and $Q_3$ is $C_2$-$C_3$-alkylene, and $X_1$ and $Y_1$ are as defined in claim 5.

8. An adsorption agent according to claim 7, wherein component (a) is an amino compound of the formula (4) or a salt thereof, wherein $R_3$ and $R_4$ are lower alkyl or benzyl.

9. An adsorption agent according to claim 8, wherein component (a) is an amino compound of the formula (4) or a salt thereof, wherein $R_3$ and $R_4$ are lower alkyl, $Y_1$ is hydrogen or —CH$_2$OH, and $X_1$ is —CH$_2$OH.

10. An adsorption agent according to claim 7, wherein component (a) is an amino compound of the formula (4) or a salt thereof, wherein $R_3$ and $R_4$, together with the nitrogen atom to which they are attached, represent a pyrrolidino, piperidino, morpholino or N-methylpiperazino group.

11. An adsorption agent according to claim 7, wherein component (a) is a quaternary ammonium salt of the formula

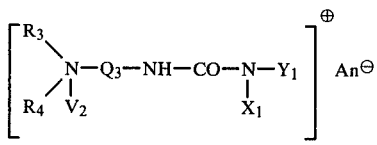

wherein each of $R_3$, $R_4$ and $V_2$ is lower alkyl, $An^\ominus$ is the anion of an organic or inorganic acid and $Q_3$, $X_1$ and $Y_1$ are as defined in claim 8.

12. An adsorption agent according to claim 11, wherein component (a) is a quaternary compound of formula (6), wherein $X_1$ is —$CH_2OH$ and $Y_1$ hydrogen or —$CH_2OH$.

13. An adsorption agent according to claim 1, wherein component (b) is a methylolated urea or amino-1,3,5-triazine, each of which can be etherified.

14. An adsorption agent according to claim 13, wherein component (b) is a N-methylol urea compound or a N-methylolmelamine compound.

15. An adsorption agent according to claim 14, wherein component (b) is methylol urea, dimethylol urea or tri- to hexamethylolmelamine.

16. An adsorption agent according to claim 15, wherein component (b) is N,N'-dimethylol urea.

17. A process for the preparation of a cationic adsorption agent, which process comprises reacting
   (a) an amino compound, or salt thereof, which contains at least one amino group and at least one free or methylolated carbamide or thiocarbamide group, or ether thereof,
   (b) an aminophast precondensate which contains no amino groups, being a formaldehyde adduct or an etherified formaldehyde adduct of a urea, thiourea or amino-1,3,5-triazine compound.

18. A process according to claim 17, wherein the reaction is conducted in the presence of a catalyst.

19. A process according to claim 18, wherein the catalyst is sulfamic acid.

* * * * *